United States Patent Office 2,871,255
Patented Jan. 27, 1959

2,871,255

1,2,3,4,5,5-HEXACHLORO-4-HYDROXYMETHYL-CYCLOPENT-2-ENE CARBOXYLIC ACID DERIVATIVES

Hyman M. Molotsky and Edward G. Ballweber, Chicago, Ill., assignors to Velsicol Chemical Corporation, Chicago, Ill., a corporation of Illinois No Drawing. Application January 8, 1957
Serial No. 632,972

6 Claims. (Cl. 260—468)

This invention relates to new compositions of matter. In particular, this invention relates to new halogenated hydroxy-acids and derivatives thereof.

One of the objects of the present invention is the preparation of new halogenated cyclic acids and derivatives thereof.

Another object of the present invention is the preparation of intermediates for the preparation of heat stable resins.

Still another object of the present invention is the preparation of new compositions of matter useful in the protection of crops from degradation.

Still other objects will become apparent from the ensuing description.

Our copending United States patent application, Serial Number 632,973, now U. S. Patent 2,829,147, describes the oxidation of 1,2,3,4,7,7-hexachlorobicyclo (2.2.1)-2,5-heptadiene to prepare several valuable compositions, including 3,4,5,6,8,8 - hexachloro - 2 - keto - 3,6 - methano-oxycycloheptene-4. As indicated in this copending United States patent application, Serial Number 632,973, while this product has utility in itself, it is also highly valuable as an intermediate in the preparation of several compositions, two of which have the following structures:

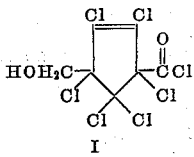

I
1,2,3,4,5,5-hexachloro-4-hydroxy-methylcyclopent-2-ene carboxylic acid chlorid

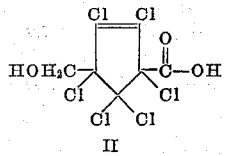

II
1,2,3,4,5,5-hexacloro-4-hydroxy-methylcyclopent-2-ene carboxylic acid As is readily ascertainable from a study of the above shown new compositions of matter, they have unique structures which account for their multifold utility. Both of these novel compositions of matter contain an unsaturated five member ring, halogen atoms and two other reactive functional groups. It is this combination of features which imparts to the compounds properties which make them and their derivatives valuable in the control of plant pests, as plant regulators and in general as unusually valuable agricultural chemicals.

In this regard, the products of this invention can be applied in a liquid solvent, in fogs, as aqueous dispersions or the like. In general, these products may be formulated and applied as pesticides by any known means. They are soluble in many nonpolar organic solvents such as carbon tetrachloride, hexane, benzene, and the like, as well as in many polar solvents including water.

Of equal importance is the use of these new compositions in the preparation of resinous matter. The new hydroxy acid may be polymerized under relatively mild temperature conditions and in the absence of catalysts into a light colored, flame resistant resin with a high heat distortion temperature. By heating this compound in the presence of an amino acid or diol a highly interesting and valuable copolymer is produced.

As previously indicated, 3,4,5,6,8,8-hexachloro-2-keto-3,6 - methano - oxacycloheptene - 4 (hereinafter referred to as oxacycloheptene) is one precursor of the new compositions of matter of the present invention. A detailed description of the preparation of oxacycloheptene is included in our copending application, U. S. Serial No. 632,973.

As described therein oxacycloheptene is readily prepared by the oxidation of 1,2,3,4,7,7-hexachlorobicyclo (2.2.1)-2,5-heptadiene. This can be accomplished by reacting the 1,2,3,4,7,7-hexachlorobicyclo (2.2.1)-2,5-heptadiene with oxygen at a temperature between about 75° C. and 150° C., preferably passing gaseous oxygen through a body of the heptadiene reactant maintained at said temperature range at a rate of about 1500 cc. per mol of reactant per minute and continuously stirring the reaction mixture. The desired oxacycloheptene is recovered by distillation as the fraction boiling between about 144–147° C., at 1 mm. Hg.

The following Examples I and II show a detailed description for the preparation of our present new compositions:

EXAMPLE I

Preparation of 1,2,3,4,5,5-hexachloro-4-hydroxymethylcyclopent-2-ene carboxylic acid chloride Into a 500 cc. three-necked flask equipped with thermometer, sparger and stirrer were placed oxacycloheptene (300 grams) prepared in accordance with the process described in U. S. Serial No. 632,973 and oxacycloheptene was heated to a temperature of 140–150° C. Hydrogen chloride was bubbled through the oxacycloheptene for one hour at which time the reaction mixture was cooled and filtered. The solid material recovered therefrom by filtration was recrystallized from pentane and had a melting point of 72°–74° C. The solid was analyzed for $C_7H_3Cl_7O_2$:

|             | C     | H    | Cl    |
|-------------|-------|------|-------|
| Theoretical | 22.89 | 0.82 | 67.62 |
| Found       | 22.76 | 0.99 | 67.60 |

Infrared analysis indicated that it has the structure denoted as I in the previous discussion.

EXAMPLE II

Preparation of 1,2,3,4,5,5-hexachloro-4-hydroxymethyl-cyclopent-2-ene carboxylic acid 1,2,3,4,5,5-hexachloro-4-hydroxymethylcyclopent-2-ene carboxylic acid chloride (10 grams) prepared in accordance with the procedure of Example I was dissolved in 100 ml. of 60% ethanol, neutralized with a 0.1 normal sodium bicarbonate solution and extracted with ether. The aqueous fraction was acidified with 0.1 normal hydrogen chloride solution and extracted with ether. The ether fraction was washed, dried over anhydrous sodium sulphate, and the ether then was evaporated therefrom by use of a steam bath. The residual oil was then washed with pentane. The white solid obtained by crystallization from pentane had a melting point of 151–153° C. and was analyzed for $C_7H_4Cl_6O_3$:

|             | C     | H    | Cl    |
|-------------|-------|------|-------|
| Theoretical | 24.12 | 1.15 | 60.99 |
| Found       | 24.32 | 1.44 | 60.99 |

Its neutralization equivalent was found to be 350.0 as compared to 348.8 calculated for 1,2,3,4,5,5-hexachloro-4-hydroxymethylcyclopent-2-ene carboxylic acid. Infrared analysis confirmed this identification.

This hydroxy-acid can also be prepared directly from oxacycloheptene by an hydrolysis reaction. Thus, by reacting the oxacycloheptene with a stoichiometric excess of 0.1 normal sulfuric acid the solid compound prepared in Example II from the corresponding acid chloride is obtained directly.

The present invention is not confined to the two compounds prepared in the foregoing examples, but rather contemplates a compound of the following structure:

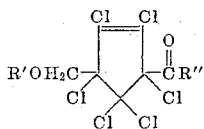

wherein R' is a radical independently selected from the group consisting of hydrogen, aliphatic, cycloaliphatic and aryl.

R" is a radical independently selected from the group consisting of hydroxy, halogen, amino, alkoxy and aryloxy.

The preceding examples describe the preparation of the hydroxy-acid chloride and hydroxy-acid.

However, the present invention is not limited to these previous illustrations. On the contrary, as shown by the above structural formula, it includes diesters, ether-esters, dialcohols, ether-acid chlorides, ether-amides and the like, readily preparable from the products of Examples I and II, and all possessing the same halogenated cyclic, bifunctional group.

The ether-esters are prepared by the reaction of either the hydroxy-acid with an organic alcohol in the ratio of one mole of hydroxy-acid per two moles of alcohol, or preferably by reacting an alkyl halide with the sodium derivatives of said hydroxy-acid or the acid-chloride. Should it be desired to prepare an ether-ester having different substituents, it may readily be accomplished by reacting the acid-chloride of Example I with an alcohol in an equimolar ratio and then reacting the hydroxy-ester with a desired alcohol to form the ether-ester. The amide may be prepared from the product of Example I by reaction with $NH_3$. The dialcohol may be prepared by reduction of the hydroxy-acid of Example II, reducing the carboxylate group to an hydroxy, and the diethers by reacting the dialcohol with an alcohol or mixture of alcohols. If desired for economic or other reasons, the alcohol reactant in the above reactions may be replaced by the corresponding halide without alteration of the desired product. Also diacids may be prepared from the oxidation of the dialcohols and the corresponding diesters from reaction of the diacid and selected alcohols. The following examples illustrate the preparation of the above indicated compositions:

EXAMPLE III

*Preparation of the allyl ester of 1,2,3,4,5,5-hexachloro-4-hydroxymethylcyclopent-2-ene carboxylic acid*

1,2,3,4,5,5-hexachloro-4-hydroxymethylcyclopent-2-ene carboxylic acid chloride (183.8 grams; 0.5 mol) prepared in accordance with the procedure in Example I is dissolved in a molar excess of allyl alcohol (184 grams; 3.0 mol) containing pyridine (5.0 grams) in a three-necked reaction vessel equipped with stirrer, thermometer and reflux condenser. (The pyridine is used to absorb any hydrogen chloride present.)

The reaction mixture is heated to about 125° C. and maintained at this temperature for two hours at which time the desired allyl ester is recovered from the reaction mixture by fractionation.

EXAMPLE IV

*Preparation of the methyl ester of 1,2,3,4,5,5-hexachloro-4-ethoxymethylcyclopent-2-ene carboxylic acid*

1,2,3,4,5,5-hexachloro-4-hydroxymethylcyclopent-2-ene carboxylic acid chloride (183.8 grams; 0.5 mol) prepared in accordance with the procedure of Example I is dissolved in a molar excess of methanol (192 grams; 6.0 mols) containing pyridine (5.0 grams) in a three-necked reaction vessel equipped with stirrer, thermometer and reflux condenser.

This reaction mixture is heated to about 125° C. and maintained at this temperature for two hours. The desired methyl ester is then recovered by fractionation of the reaction mixture.

The methyl ester (190.8 grams; 0.5 mol) is then dissolved in an excess of sodium hydroxide (200 grams; 5.0 mols) in a three-necked reaction vessel equipped with stirrer, thermometer and sparger and heated to about 125° C. Ethyl chloride (gas) is then bubbled through the above mixture at a rate of about 2 grams per minute for approximately two hours, maintaining the temperature at about 125° C. The desired product is then recovered by fractionation of the reaction mixture.

EXAMPLE V

*Preparation of the amide of 1,2,3,4,5,5-hexachloro-4-hydroxymethylcyclopent-2-ene carboxylic acid*

1,2,3,4,5,5-hexachloro-4-hydroxymethylcyclopent-2-ene carboxylic acid chloride (183.8 grams; 0.5 mol) prepared in accordance with the procedure of Example I is dissolved in a molar excess of ammonium hydroxide (70.0 grams; 2.0 mol) in a three-necked reaction vessel equipped with stirrer and thermometer and heated to about 75° C. The desired product is then recovered by filtration of the reaction mixture.

The alcohols usable in these reactions may be aliphatic, cycloaliphatic or aromatic. They may be substituted alcohols, saturated or unsaturated of varying length, although those containing up to 22 carbon atoms are preferable. The following list exemplifies these alcohols, but is only illustrative thereof and not to be interpreted as a limitation on this reactant. The product of such reaction will naturally contain the residual radical of these alcohols as ether or ester groups depending, as indicated above, on the other reactant.

TABLE I

| | |
|---|---|
| Allyl alcohol | Cyclohexenol |
| Methyl alcohol | Phenol |
| Isopropyl alcohol | Chlorophenol |
| n-Undecyl alcohol | Benzyl alcohol |
| Ethoxyethanol | Furfuryl alcohol |
| Propargyl alcohol | Ricinoleic alcohol |
| Butenediol | 5-nonanol |
| Butane diol | Hesperetol |
| Cyclohexanol | 1-borneol |
| Cyclopentanol | 1-heptadecanol |

This table merely shows a portion of the alcohols which are usable in accordance with the above indicated preparations. Further, the corresponding halide (i. e., methyl chloride, chlorobenzene, etc.) may be substituted for the above listed alcohols to produce the same valuable products.

As previously indicated, the compositions of the present invention are superior agricultural chemicals. Thus, for example, they can be used to control such undesirable insect pests as army worms, termites, and ants.

Various formulations of these compositions may be used with the choice of formulation being dependent on several factors, such as the identity and quantity of the insect pests, type of area being treated (residential, industrial, vacant, etc.), and available equipment for application of the insecticide.

Typical formulations of the compositions of the present invention are as follows:

*Formulation A*

| | Percent by weight |
|---|---|
| Product of Example II | 50 |
| Celite 209 | 50 |

Celite 209 is a diatomaceous earth utilized as a relatively inert carrier. The composition represented here is a 50% dust or granular.

*Formulation B*

| | Percent by weight |
|---|---|
| Product of Example III | 70 |
| Micro Cel A | 27 |
| Triton X-100 | 3 |

Triton X-100 is a wetting agent, chemically being an alkyl aryl polyether alcohol. Micro Cel A is a synthetic, relatively inert, porous carrier material consisting substantially of calcium silicate. This formulation is a 70% wettable powder.

*Formulation C*

| | Percent by weight |
|---|---|
| Product of Example IV | 50 |
| Isopropyl acetate | 33.4 |
| Isopropyl alcohol | 2 |
| Atlas G-1690 | 14.6 |

Atlas G-1690 is a commercially obtainable emulsifier. This formulation is an emulsifiable concentrate.

We claim:

1. 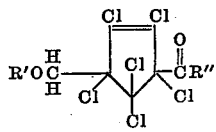

wherein R' is a radical independently selected from the group consisting of hydrogen and lower alkyl and R" is a radical independently selected from the group consisting of hydroxy, lower alkoxy, lower alkenoxy, halogen and amine.

2. 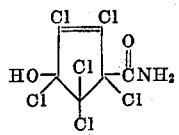

3. 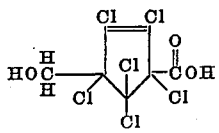

4. 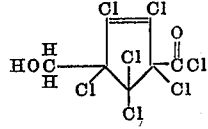

5. 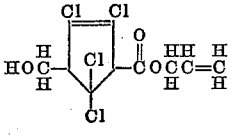

6. 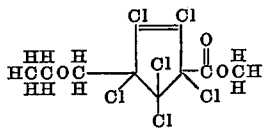

References Cited in the file of this patent

UNITED STATES PATENTS 2,508,182    McBee et al. _____ May 16, 1950